(12) United States Patent
Medin et al.

(10) Patent No.: US 11,079,823 B1
(45) Date of Patent: Aug. 3, 2021

(54) METHOD AND APPARATUS FOR AUXILIARY PORT FUNCTION DISTINCTION

(71) Applicant: Gulfstream Aerospace Corporation, Savannah, GA (US)

(72) Inventors: Kristin Medin, Savannah, GA (US); Timothy O'Hara, Savannah, GA (US); Dean Knight, Savannah, GA (US); Matthew Wallace, Savannah, GA (US); Kenneth Carden, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/749,055

(22) Filed: Jan. 22, 2020

(51) Int. Cl.
*G06F 1/26* (2006.01)
*G06F 13/20* (2006.01)
*G06F 3/14* (2006.01)
*G06F 13/42* (2006.01)

(52) U.S. Cl.
CPC ............... *G06F 1/266* (2013.01); *G06F 3/14* (2013.01); *G06F 13/20* (2013.01); *G06F 13/4282* (2013.01); *G06F 2213/0042* (2013.01)

(58) Field of Classification Search
CPC . G06F 1/266; G06F 3/14; G06F 13/20; G06F 13/4282; G06F 2213/0042
See application file for complete search history.

(56) References Cited

U.S. PATENT DOCUMENTS

| | | | |
|---|---|---|---|
| 6,971,907 B1 | 12/2005 | Stroud | |
| 8,773,078 B2* | 7/2014 | Yu | H02J 7/00 |
| | | | 320/162 |
| 9,481,332 B1* | 11/2016 | Lee | B64D 11/00 |
| 9,923,390 B2* | 3/2018 | Chen | H02J 7/0036 |
| 10,489,324 B2* | 11/2019 | Sporck | H01R 13/7175 |
| 2006/0282552 A1 | 12/2006 | Bhesania et al. | |
| 2006/0282567 A1* | 12/2006 | Bhesania | H04L 43/0811 |
| | | | 710/52 |
| 2011/0266980 A1* | 11/2011 | Schellenberg | H05B 47/115 |
| | | | 315/362 |
| 2012/0021639 A1* | 1/2012 | Serrano | H01R 13/7175 |
| | | | 439/488 |

(Continued)

FOREIGN PATENT DOCUMENTS

| | | |
|---|---|---|
| CN | 105975038 A | 9/2016 |
| EP | 2966574 A1 | 1/2016 |

*Primary Examiner* — Glenn A. Auve
(74) *Attorney, Agent, or Firm* — LKGlobal | Lorenz & Kopf, LLP (57) ABSTRACT

The present application relates to providing auxiliary port function distinction by illuminating a first light emitting diode around a data transfer capable port wherein the first light emitting diode is illuminated in a first color, illuminating a second light emitting diode around a charge only port, receiving a first data connection request at the charge only port, illuminating the first light emitting diode a second color in response to the data connection request, receiving a second data connection request at the data transfer capable port, initiating a data connection handshake between a device connected to the data transfer capable port and a processor in response to the second data connection request, and illuminating the first light emitting diode the second color in response to the initiation of the data connection handshake.

20 Claims, 4 Drawing Sheets

(56) References Cited

U.S. PATENT DOCUMENTS

| | | | |
|---|---|---|---|
| 2015/0318728 A1 | 11/2015 | Ghosh et al. | |
| 2015/0340826 A1* | 11/2015 | Chien | H01R 27/02 |
| | | | 439/490 |
| 2016/0011885 A1* | 1/2016 | Hsieh | G06F 13/4068 |
| | | | 710/304 |
| 2016/0152340 A1* | 6/2016 | Bauer | B64D 11/0015 |
| | | | 297/217.3 |
| 2016/0172796 A1* | 6/2016 | Humphreys | H01R 13/7175 |
| | | | 439/620.21 |
| 2016/0257247 A1* | 9/2016 | Munday | B60Q 3/233 |
| 2017/0005494 A1* | 1/2017 | Li | H02J 7/0013 |
| 2017/0005495 A1* | 1/2017 | Yang | G06F 1/266 |
| 2017/0270067 A1* | 9/2017 | Hu | G06F 13/366 |
| 2018/0358765 A1* | 12/2018 | Byrne | A47B 21/06 |
| 2019/0121647 A1* | 4/2019 | Por | G06F 11/2284 |

* cited by examiner

METHOD AND APPARATUS FOR AUXILIARY PORT FUNCTION DISTINCTION

BACKGROUND

The present disclosure relates generally to programming of electronic auxiliary port capability distinction systems. More specifically, aspects of this disclosure relate to systems, methods and devices for generating an indicator during connection of an auxiliary port and connected device indicating the capabilities of the auxiliary port.

Electronic auxiliary ports, such as universal serial bus (USB) ports or the like, are becoming ubiquitous as the use of rechargeable portable electronic devices increases. During this increase, the USB port has become a de facto standard for manufacturers and users looking for convenient and readily available charging locations. In addition to enabling communications between devices, the USB port also supplies a power supply to the connected device enabling charging during communications or simply during connection to a USB power supply. Auxiliary ports have become ubiquitous in restaurants, coffee shops, automobiles, aircraft, trains, and virtually any device that plugs into a wall, such as lamps and alarm clocks.

However, certain auxiliary ports have the capability of providing both data and/or power charging depending on how they are wired. Typically, the wiring is not exposed to an end user, so the capability of the port is communicated by a traditional means of markings, such as wattage or industry standard icons. These ports may be installed in areas where there is not consistent or significant ambient lighting to aid users in being able to identify the ideal auxiliary port for an intended use. For example, in an aircraft, labels such as "charge a personal electronic device" or "stream content from a personal electronic device" may not be legible for a number of ports which otherwise appear identical. It would be desirable to provide an improved functionality indication for auxiliary charge ports in order to overcome the aforementioned problems and to enable end users to access the auxiliary ports who may have impairments in vision or mobility.

The above information disclosed in this background section is only for enhancement of understanding of the background of the invention and therefore it may contain information that does not form the prior art that is already known in this country to a person of ordinary skill in the art.

SUMMARY

Disclosed herein are electronic device communications charging systems and method and related control logic for provisioning auxiliary ports, methods for making and methods for operating such systems, and vehicles equipped with onboard control systems. By way of example, and not limitation, there is presented an aircraft with onboard auxiliary charging and communications ports and control systems.

In accordance with an aspect of the present disclosure, an apparatus including, but not limited to, a data transfer capable port for receiving a data signal and for providing a first voltage to a first connected device, a first light emitting diode proximate to the data transfer capable port wherein the first light emitting diode emits a first color light and a second color light, a charge only capable port for providing a second voltage to a second connected device, a second light emitting diode proximate to the charge only capable port wherein the second light emitting diode emits the first color light, a power supply for generating the first voltage and the second voltage and for coupling the first voltage to the data transfer capable port and the second voltage to the charge only capable port, and a processor to detect a data connection request received at the charge only capable port and for generating a control signal for switching the first light emitting diode from the first color light to the second color light in response to the data connection request.

In accordance with another aspect of the present disclosure wherein the data transfer capable port is operative to couple the data signal to the processor.

In accordance with another aspect of the present disclosure including a display and wherein the data signal is a video signal received from the first connected device and the data transfer capable port is operative to couple the video signal to the display.

In accordance with another aspect of the present disclosure wherein the first color light is white and the second color light is blue.

In accordance with another aspect of the present disclosure wherein the first light emitting diode forms a ring around the data transfer capable port.

In accordance with another aspect of the present disclosure wherein the power supply is operative to receive the data connection request and to couple the data connection request to the processor.

In accordance with another aspect of the present disclosure wherein the data transfer capable port is a universal serial bus port and the first voltage is a five-volt direct current voltage.

In accordance with another aspect of the present disclosure, a method performed by a processor including, but not limited to, illuminating a first light emitting diode around a data transfer capable port wherein the first light emitting diode is illuminated in a first color, illuminating a second light emitting diode around a charge only port, receiving a first data connection request at the charge only port, illuminating the first light emitting diode a second color in response to the data connection request, receiving a second data connection request at the data transfer capable port, initiating a data connection handshake between a device connected to the data transfer capable port and a processor in response to the second data connection request, and illuminating the first light emitting diode the second color in response to the initiation of the data connection handshake.

In accordance with another aspect of the present disclosure wherein the first color is white.

In accordance with another aspect of the present disclosure further including generating a video signal in response to a data received from the device and displaying the video signal on a display.

In accordance with another aspect of the present disclosure wherein the processor is a video processor operative to generate a video signal in response to a data received from the device.

In accordance with another aspect of the present disclosure wherein the data transfer capable port is a universal serial bus type C® connector.

In accordance with another aspect of the present disclosure wherein the data transfer capable port is operative to detect the first data connection request received at the charge only port in response to an indicator generated by the charge only port.

In accordance with another aspect of the present disclosure wherein illuminating the first light emitting diode a second color includes alternating the first color and the second color.

In accordance with another aspect of the present disclosure wherein the second color is blue.

In accordance with another aspect of the present disclosure wherein the method is performed by an aircraft entertainment system.

In accordance with another aspect of the present disclosure wherein the data transfer capable port and the charge only port form a portion of an entertainment system user interface.

In accordance with another aspect of the present disclosure an entertainment system including, but not limited to, a user interface having a data transfer capable port with a first light emitting diode and a charge only port having a second light emitting diode, a power supply for supplying a voltage to the user interface and for detecting a data connection request at the charge only port and for generating a control signal in response to detecting the data connection request, a processor to operative to change an illumination color of the first light emitting diode in response to the control signal and to receive a data from the data transfer capable port, to change the illumination color of the first light emitting diode in response to the reception of the data, to generate a video signal in response to the data, and a display to display a video in response to the video signal.

In accordance with another aspect of the present disclosure wherein the first light emitting diode may emit a white light and a blue light.

In accordance with another aspect of the present disclosure wherein the data is generated by a mobile electronic device coupled to the data transfer capable port.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
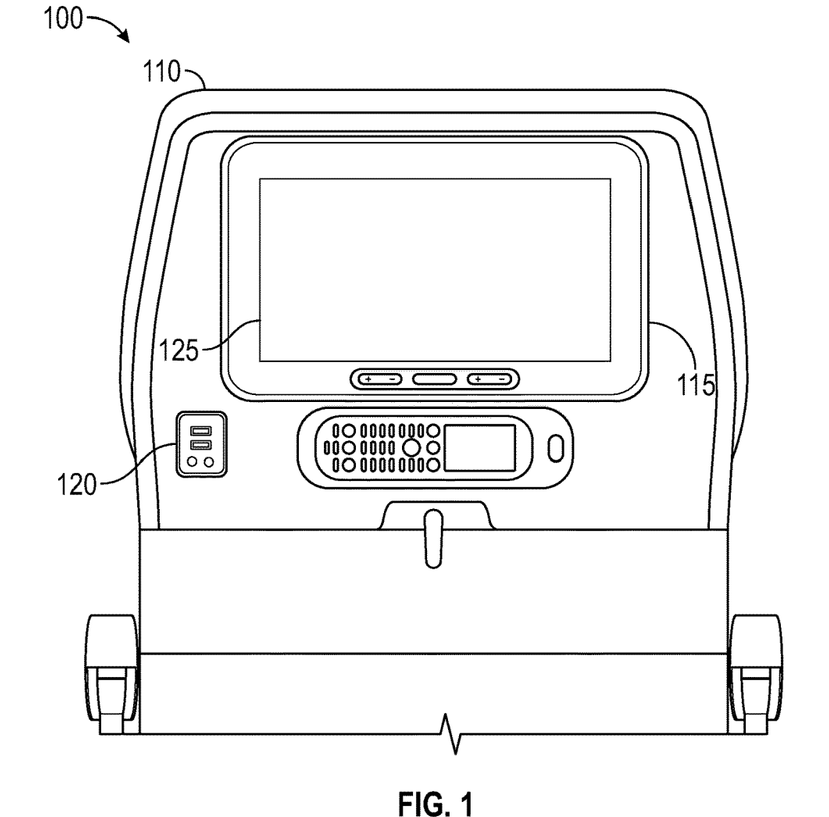
FIG. 1 shows a schematic view illustrating an operating environment for providing auxiliary port function distinction according to an exemplary embodiment.

10036 FIG. 1 schematically illustrates an exemplary operating environment 100 for providing auxiliary port function distinction 110 according to an exemplary embodiment of the present disclosure. The exemplary operating environment 100 depicts an aircraft seatback 110 having an installed entertainment system 115. The exemplary installed entertainment system 115 may include a display 125 and an interface 120 with two or more auxiliary ports.

In this example, an auxiliary port within the interface 120 may be capable of data transfer, such as video or audio streaming, and will illuminate a non-white color briefly when the transfer "handshake" is initiated either by the aircraft system or when the user plugs a device into that port. For example, auxiliary ports in an aircraft cabin may be surrounded by a rear-illuminated halo which presents color temperatures in the white color family only. Componentry behind the interface and close to the auxiliary ports may include an affordance for an additional, alternative, distinct color LED array to saliently indicate to the end user the capability of one auxiliary port 120 over a neighboring port.

Figure 2:
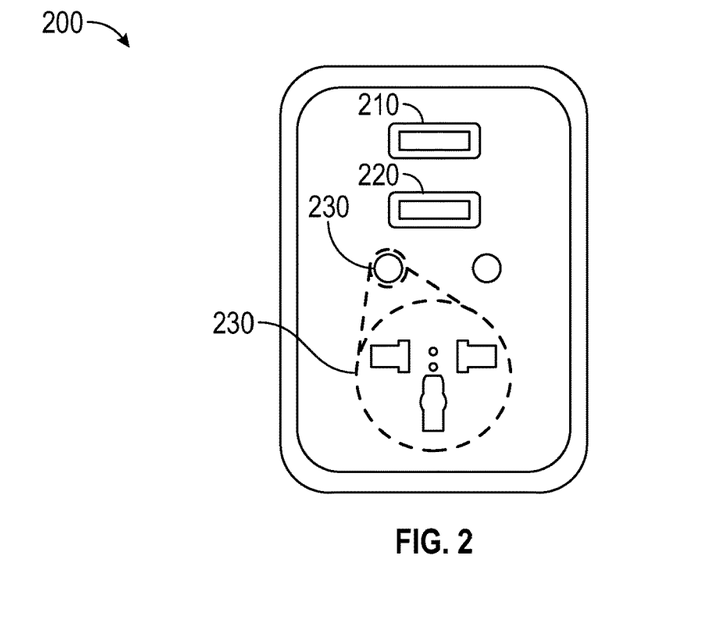
FIG. 2 shows a schematic view illustrating an exemplary user interface for providing auxiliary port function distinction according to an exemplary embodiment.

With continuing reference to FIG. 1, FIG. 2 is a schematic view illustrating an exemplary user interface 200 for providing auxiliary port function distinction according to an exemplary embodiment of the present disclosure is shown. In an exemplary embodiment, the interface 200 includes a data transfer capable auxiliary port 210, a charge only auxiliary port 220, one or more audio output connections 230 and a power supply output 240. Each of the auxiliary ports 210, 220 is surrounded by a while light halo indicative of an active auxiliary port. If a user connects a device, such as a mobile phone, to the data transfer capable auxiliary port 210, the light halo surrounding the data transfer capable auxiliary port 210 will turn blue for a duration of time, such as five seconds, in response to a data connection between the device and a data server being initiated or established. This provides the user with a visual indication that the device has been connected to a data transfer capable auxiliary port 210 and that a data connection or connection handshake has been initiated. Alternatively, if the user connects a device to a charge only auxiliary port 220, the halo may remain white, indicating that a data connection has is not being initiated. In addition, the server or the data transfer capable auxiliary port 120 may detect that a device has been connected to the charge only auxiliary port 220 and flash an alternate color on the data transfer capable auxiliary port 120 halo providing a visual indicator of which auxiliary port 210, 220 is data transfer capable.

In an alternative exemplary embodiment, a mobile device may include an application capable of communications with a device via the data transfer capable auxiliary port 210. If the user plugs the device into the data transfer capable auxiliary port 210, the data transfer capable auxiliary port 210 will illuminate a blue halo for a duration of time indicating that a connection is being established with the server and the application may indicate that the device has been connected. If the user plugs into the charge only auxiliary port 220, the charge only auxiliary port 220 will maintain the white light halo and the application will indicate charging only. If the user tries to initiate communications with the server while connected to the charge only auxiliary port 220, the application may display a graphic indicative of the interface 200 and/or the interface configuration, indicating the location of the data transfer capable auxiliary port 210. The data transfer capable auxiliary port 210 may further flash an alternative color halo or maintain an alternative color halo for a duration of time to aid the user in connecting the device to the data transfer capable auxiliary port 210.

Figure 3:
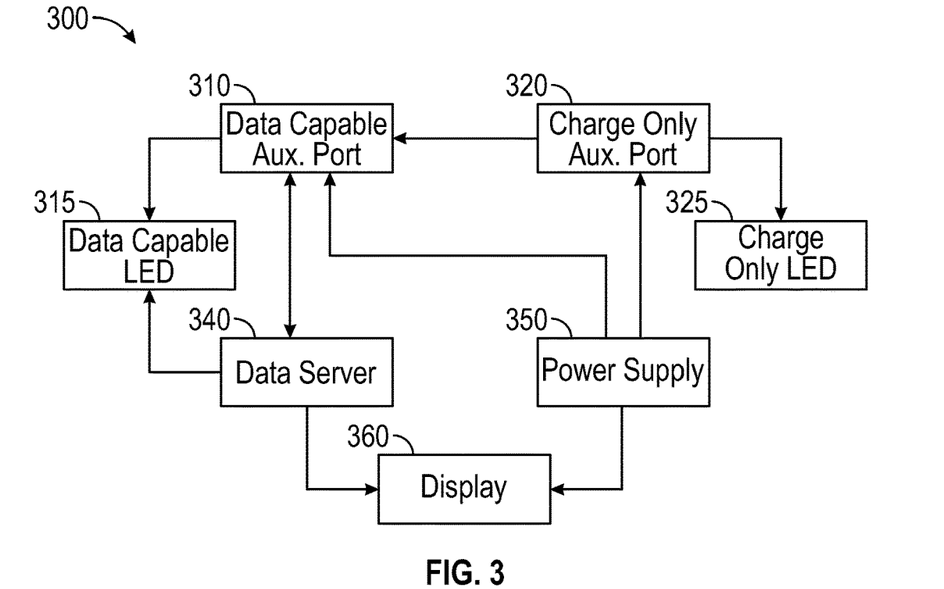
FIG. 3 shows a block diagram illustrating a system for auxiliary port function distinction according to an exemplary embodiment.

Turning now to FIG. 3, a block diagram illustrating an exemplary implementation of a system 300 for providing auxiliary port function distinction is shown. The system 300 may include a data transfer capable auxiliary port 310, an associated data transfer capable auxiliary port light emitting diode (LED) 315, a charge only auxiliary port 320, an associated charge only auxiliary port LED 325, a power supply 350, a data server 340 and a display 360. Although the exemplary embodiment is described in terms of an aircraft cabin environment, it is not limited thereto and is equally applicable to other suitable environments.

The data transfer capable auxiliary port 310 is operative to receive a connection from a device, such as a mobile phone, personal computer, tablet or the like. The data transfer capable auxiliary port 310 may be a universal serial bus connector, such as a USB-C® connector, and is operative to provide a connection for coupling data between the connected device and the data server 340. For example, the data transfer capable auxiliary port 310 may be a USB-C® connector operative to enable streaming video data between the connected device and the data server 340. The data server 340 may then couple this streaming video data to the display for display 360 to a user. In addition, the data transfer capable auxiliary port 310 may be coupled to the power supply for receiving a voltage to supply to the connected device. For example, the power supply 350 may be operative to couple a five-volt power signal to the data transfer capable auxiliary port 310. These five volts are then coupled to the connected device for supplying voltage and/or recharging the connected device.

In one exemplary embodiment, the data transfer capable auxiliary port 310 may be further operative to illuminate the data transfer capable auxiliary port LED 315 using some voltage supplied by the power supply 350. During normal operation or when no connected device is connected to the data transfer capable auxiliary port 310, the data transfer capable auxiliary port LED 315 may be illuminated in a first color, such as white. In response to a data connection between a connected device and the data server 340, the data server 340 may be operative to transmit a control signal to the data transfer capable auxiliary port LED 315 to illuminate in an alternate color, such as blue. In one exemplary embodiment, the data transfer capable auxiliary port LED 315 is a halo LED surrounding the data transfer capable auxiliary port 310.

The charge only auxiliary port 320 is operative to receive a voltage from the power supply 350 to supply to a connected device for charging the connected device. The charge only auxiliary port 320 is further operative to provide a voltage to the charge only auxiliary port LED 325 for illuminating the charge only auxiliary port LED 325. The charge only auxiliary LED 325 may be illuminated in a first color, such as white and is used by a user for identifying the location of the charge only auxiliary port 320 in low light conditions or the like for connecting a connected device, such as a mobile phone, etc.

In an exemplary embodiment, the data server 340 is operative to receive data from a connected device for the like via the data transfer capable auxiliary port 310. In response to a detected connect of a connected device, the data server 340 may then generate a control signal to couple to the data transfer capable auxiliary port LED 315. The data transfer capable auxiliary port LED 315 is then operative to display a second color, such as blue, for a duration of time in response to the control signal to provide a visual cue to the user of the connected device that a data connection is being initiated between the data server 340 and the connected device.

In another exemplary embodiment, if a connected device is coupled to the charge only auxiliary port 320, a voltage is suppled from the power supply 350 to the connected device via the charge only auxiliary port 320 to charge and/or power the connected device. In addition, if a request for a data connection from the connected device is initiated, the charge only auxiliary port 320 may couple the request, or generate a representative control signal, to the data transfer capable auxiliary port 310. The data transfer capable auxiliary port 310 may couple the request or representative control signal to the data server 340 indicating a request for connection from the device coupled to the charge only auxiliary port 320, The data server 340 may then generate a control signal to couple to the data transfer capable auxiliary port LED 315 to illuminate the data transfer capable auxiliary port LED 315 in an alternate color, such as blue, or to flash the data transfer capable auxiliary port LED 315 intermittently. This illumination of the data transfer capable auxiliary port LED 315 in an alternate color is operative to notify the connected device user that the connected device should be connected to the data transfer capable auxiliary port 310 in order to communicate with the data server 340 and to indicate the location of the data transfer capable auxiliary port 310 to the connected device user. In an alternate embodiment, the data transfer capable auxiliary port 310 may receive the indication of the request from the charge only auxiliary port 320 and may generate the control signal to illuminate the data transfer capable auxiliary port LED 315 in the alternate color.

Figure 4:
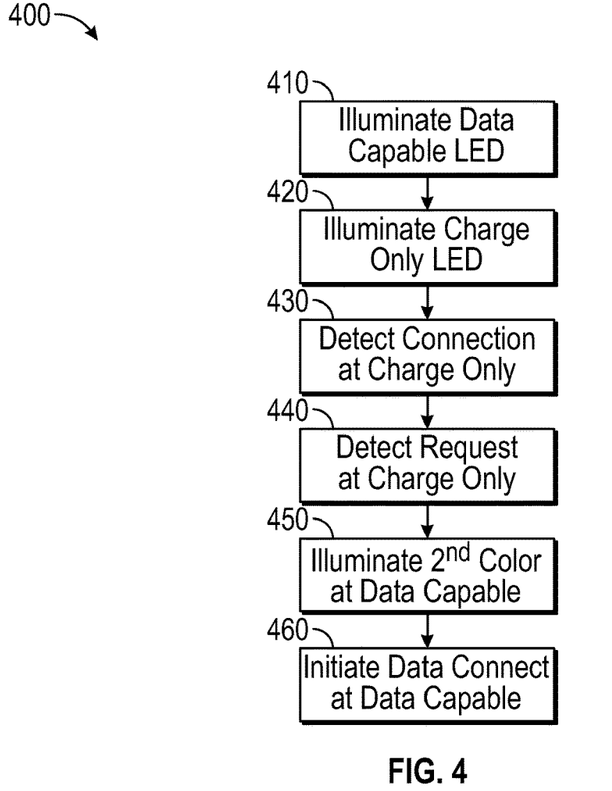
FIG. 4 shows a flow chart illustrating a method for providing auxiliary port function distinction according to another exemplary embodiment.

Turning now to FIG. 4, a flow chart illustrating an exemplary implementation of a method 400 for providing auxiliary port function distinction is shown. Upon initiation of an auxiliary port data and power distribution system, the method is first operative to illuminate 410 a first light emitting diode proximate to a data transfer capable auxiliary port a first color. The first light emitting diode may be a halo LED configuration around the data transfer capable auxiliary port for this exemplary embodiment. The first LED may be illuminated in response to a power received from a power supply or the like and may be independent of the data transfer capable auxiliary port. In this exemplary embodiment, the first color may be white and may be provided as a visual indicator to aid a user in establishing a physical connection with a device.

The method is next operative to illuminate 420 a second light emitting diode proximate to a charge only capable auxiliary port the first color. The second LED may also be a halo LED configuration around the charge only auxiliary port for this exemplary embodiment. The second LED may be illuminated in response to a power received from a power supply or the like and may be independent of the charge only capable auxiliary port. In this exemplary embodiment, the first color may be white and may be provided as a visual indicator to aid a user in establishing a physical connection with a device.

The method is next operative for detecting 430 a connection of an electronic device at the charge only capable auxiliary port. The connection may be made in response to activation of a physical switch during insertion of a connector at the charge only capable auxiliary port or made be made in response to a detection of a current flow between a power supply and the charge only capable auxiliary port indicating that a device has been connected to the port and is drawing power from the power supply through the port.

The method is next operative for receiving 440 a request for a data connection to a data server at the charge only capable auxiliary port. In one embodiment, the request may be made via an electrical connection between charge only capable auxiliary port and the data transfer capable auxiliary port. The data transfer capable auxiliary port circuitry may detect that a request has been made at the charge only capable auxiliary port and may generate a control signal to couple to a processor or server. Alternatively, the charge only auxiliary port or a power supply supplying a voltage to a connected device may sense a change in voltage or current indicative of a request for a data connection being made.

In response to detecting a data connection request at the charge only capable auxiliary port, the method may then generate 450 a control signal to illuminate the first light emitting diode proximate to the data transfer capable auxiliary port a second color in response to the request for a data connection. The processor or server may generate a control signal to couple to the data transfer capable auxiliary port LED to initiate a change of color or the data transfer capable auxiliary port may receive, intercept, or detect the request and initiate the change of color of the data transfer capable auxiliary port LED.

The method may then initiate 460 a data connection to the server in response to detecting a connection of the electronic device at the data transfer capable auxiliary port. In an exemplary embodiment, a user may move a connected device connection from a charge only auxiliary port to the data transfer capable auxiliary port. A processor is then operative to detect a request for a data connection between the connected device and a server. The processor is then operative to enable the connection and to change the color of the data transfer capable auxiliary port LED to a second, alternative, color to indicate to the user that a data connection has been initiated and/or established.

Figure 5:
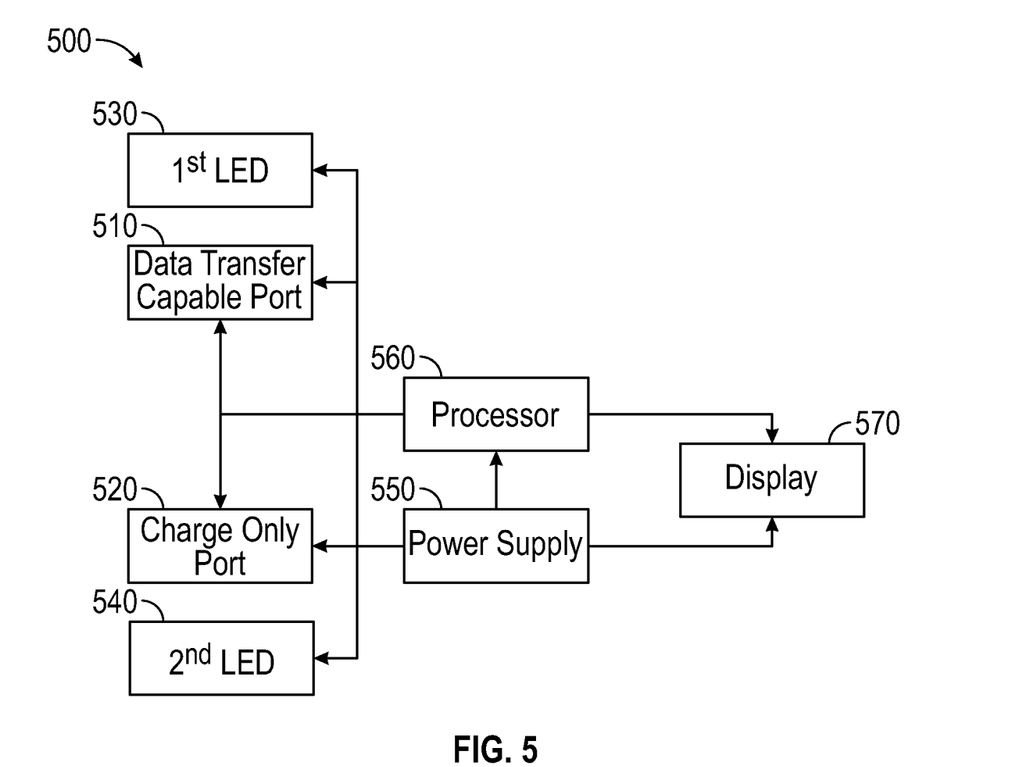
FIG. 5 shows a block diagram illustrating a system for providing auxiliary port function distinction according to another exemplary embodiment.

Turning now to FIG. 5, a block diagram illustrating another exemplary implementation of a system 500 for providing auxiliary port function distinction is shown. The system 500 may include a data transfer capable port 510, a charge only port 520, a first light emitting diode 530, a second light emitting diode 540, a power supply 550, a processor 560 and a display 570. In this exemplary embodiment, the system 500 is an aircraft cabin entertainment system wherein the data transfer capable port 510, the charge only port 520, the first light emitting diode 530, and the second light emitting diode 540 may be part of a user interface mounted proximate to a user seating position, such as a seatback, armrest, bulkhead panel or the like.

The data transfer capable port 510 for receiving a data signal and for providing a first voltage to a first connected device. The data transfer capable port 510 may be a USB-C port or the like for electrically coupling a connected device, such as a mobile phone, computer, video streaming device or the like. The data transfer capable port 510 may be operative to receive data from a connected device and to couple this data to the processor 560. The first light emitting diode 530 may be mounted proximate to the data transfer capable port 510 wherein the first light emitting diode 530 emits a first color light and a second color light. The first light emitting diode 530 may be a circular or halo structure surrounding the data transfer capable port 510 and may be illuminated in the first color light to aid a user in locating the data transfer capable port 510 and to aid in connection of the connected device to the data transfer capable port 510. The data transfer capable port 510 may further be operative to supply a voltage to the connected device in order to recharge a rechargeable battery within the connected device or in order to supply operating power to the connected device. For example, the device may be a USB thumb drive or memory stick for providing the data file connected to the data transfer capable port 510 and operation of the device may be entirely powered by the supplied voltage.

The charge only port 520 is operative for providing a second voltage to a second connected device. In this exemplary embodiment, the charge only capable port 520 is capable of supplying a voltage to a connected device but is unable to perform a data transfer between a connected device and a server or the processor 560. In one exemplary embodiment, the charge only port 520 may be coupled to the data transfer capable port 510 and may be able to couple an indicator to the charge only port 520 in order to indicate that a data connection request has been received at the charge only port 520. In response to the indication, the data transfer capable port 510 may be able to generate a control signal indicative of a data connection request that has been received at the charge only port 520 and to couple the control signal to the processor 560. A second light emitting diode 540 may be mounted proximate to the charge only port 520 wherein the second light emitting diode 540 emits the first color light, such as white. The second light emitting diode 540 may be a circular or halo structure surrounding the charge only port 520 and may be illuminated in the first color light to aid a user in locating the charge only port 510 and to aid in connection of the connected device to the charge only port 510.

The system 500 may further include a power supply 550 for generating the first voltage and the second voltage and for coupling the first voltage to the data transfer capable port 510 and the second voltage to the charge only port 520. In an exemplary embodiment, the data transfer capable port 510 and the charge only port 520 may be USB ports and the power supply 550 may be operative to supply a five-volt voltage to each of the ports in order to power and/or charge a device connected to a port. The power supply 550 may be further operative to supply a voltage to illuminate the first light emitting diode 530 the first color light and the second light emitting diode 540 the first color light. For example, in response to suppling a voltage to the data transfer capable port 510 and the charge only port 520, the power supply may further illuminate the first light emitting diode 530 white and the second light emitting diode 540 white to indicate to a user that the ports are enabled. The power supply 550 may be further operative to supply a voltage to the processor 560 and/or the display 570.

The processor 560 may be operative to detect a data connection request received at the charge only port 520 and for generating a control signal for switching the first light emitting diode 530 from the first color light to the second color light in response to the detection data connection request. For example, during initiation of the system 500, the first light emitting diode 530 and the second light emitting diode 540 may be illuminated white in response to a voltage supplied by a power supply. The first light emitting diode 530 and the second light emitting diode 540 to indicate to a user that the first light emitting diode 530 and the second light emitting diode 540 are enabled and to help the user in locating the first light emitting diode 530 and the second light emitting diode 540 in a dimly lit environment. The first light emitting diode 530 and the second light emitting diode 540 may each be a halo shape surrounding the data transfer capable port 510 and the charge only port 520. In response to detecting a data connection request at the charge only port 520, the processor 560 may then illuminate the first light emitting diode 530 in a second color light, such as blue, in order to indicate to a user that the correct port for a data connection. In response to a connection of a device at the data transfer capable port 510, the processor 560 may generate a control signal to illuminate the first light emitting diode 530 a second light color in order to indicate to a user that a data connection is available. Alternatively, the first light emitting diode 530 may be illuminated a second light color to indicate that a data connection handshake has been initiated in response to a data connection request from the connected device at the data transfer capable port 510.

In one exemplary embodiment, the system 500 may further include a video display for display a video in response from data signal received from a connected device. For example, a user may stream a video from a mobile phone to the processor 560 and the display 570 via the data transfer capable port 510. The display 570 may be a cabin display viewable by multiple passengers within an aircraft cabin, or the display 570 may be located proximate to the data transfer capable port 510, such as in a seatback, and be viewable by a single passenger.

Figure 6:
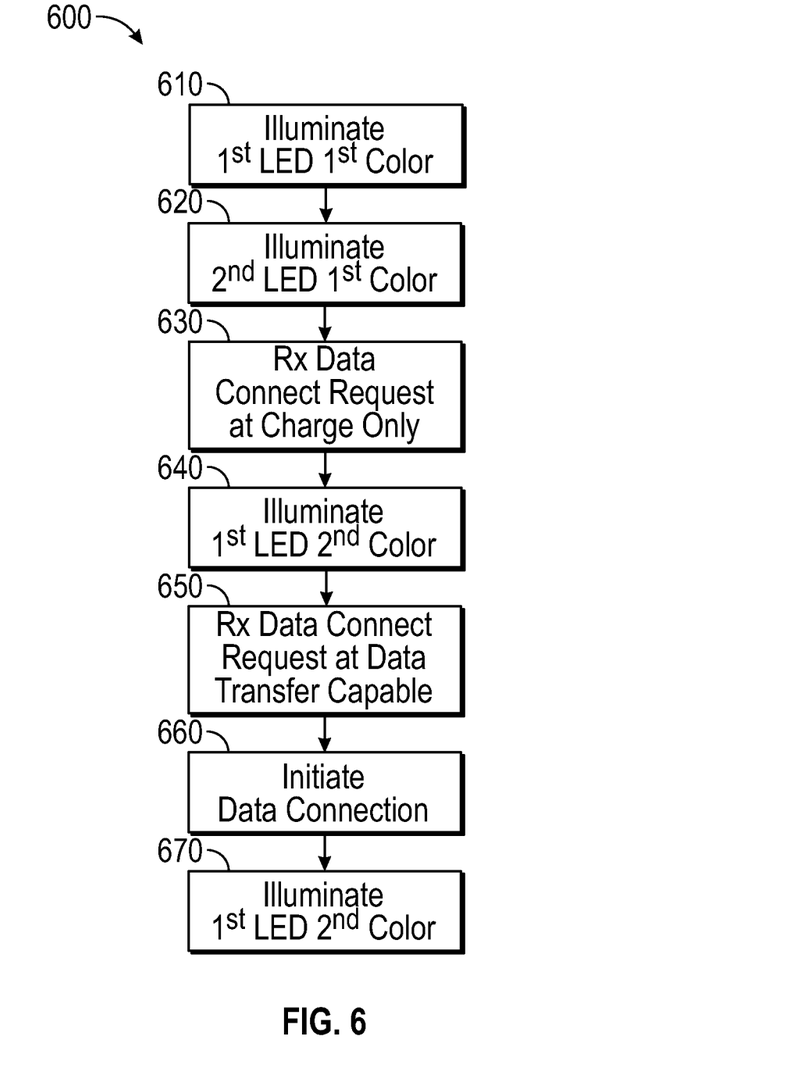
FIG. 6 shows a flow chart illustrating a method for providing auxiliary port function distinction according to another exemplary embodiment.

Turning now to FIG. 6, a flow chart illustrating an exemplary implementation of a method 600 for providing auxiliary port function distinction is shown. In this exemplary embodiment, the method 600 may be performed by an aircraft entertainment system. Further, the data transfer capable port and the charge only port may form a portion of an entertainment system user interface operative to couple a mobile device to the aircraft entertainment system.

The exemplary method 600 is first operative for illuminating 610 a first light emitting diode around a data transfer capable port wherein the first light emitting diode is illuminated in a first color. The method is next operative for illuminating 620 a second light emitting diode around a charge only port. In this exemplary embodiment, the first light emitting diode and the second light emitting diode are illuminated in a white color light in response to a power signal provided by a power supply. The power supply may be operative to power one or more portions of the aircraft entertainment system, such as the data server or the display, as well as providing power to the user interface which incorporates the first light emitting diode and the second light emitting diode. In this exemplary embodiment, the power supplied to the user interface may be a five-volt power supply which is coupled to the charge only power, the data transfer capable port, the first light emitting diode and the second light emitting diode;

The method is next operative for receiving 630 a first data connection request at the charge only port. The data connection request may be initiated in response to a user request on a mobile device such as a request within an application to stream video from a smart phone. In a first exemplary embodiment the data transfer capable port may be operative to detect the first data connection request received at the charge only port in response to an indicator generated by the charge only port and to couple notification of this detection to a processor or the like. Alternatively, a power supply circuit may be enabled to detection a change in voltage level associated with a data connection request received at the charge only port. The power supply may then generate a notification of the data connection request and couple the notification to a processor.

The method is next operative for illuminating 640 the first light emitting diode a second color in response to the data connection request; In an exemplary embodiment, illuminating the first light emitting diode a second color may include alternating the first color and the second color, such as blinking the LED in an alternating white and blue pattern. In an exemplary embodiment, if the user has a mobile device connected to the charge only port and is requesting a data connection, the user will need to move the connection from the charge only port to the data transfer capable port. To facilitate the port change for the user, the method is operative to change the illumination of the data transfer capable port LED to an alternate color in order to alert the user to the correct port. In addition, a mobile device application may further be operative to generate a user notification for display on an application alerting the user of the need to switch ports and providing an indication of the location of the port. For example, the application may display the user interface having the data transfer capable port and the charge only port and indicate to a user which port is needed for the data transfer operation.

The method is next operative to receive 650 a second data connection request at the data transfer capable port. In an exemplary embodiment, the data transfer capable port may be a universal serial bus type C® connector. In response to the user switching the connection of the connected device from the charge only port to the data transfer capable port and requesting a data connection, the method may then receive the second data connection request and couple this request to a processor. In response the method may next initiate 660 a data connection handshake between a device connected to the data transfer capable port and a processor in response to the second data connection request and illuminate 670 the first light emitting diode the second color in response to the initiation of the data connection handshake. The illumination of the first emitting diode the second color may provide an indication to user that a data connection has been initiated at the port and that the connected device is now coupled to a data transfer capable port.

In an exemplary embodiment, the method may be further operative for generating a video signal in response to a data received from the device and displaying the video signal on a display. For example, the processor may be a video processor operative to generate a video signal in response to a data received from the connected device.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
a data transfer capable port configured to receive a data signal and for providing
a first voltage to a first connected device;
a first light emitting diode proximate to the data transfer capable port wherein the first light emitting diode is configured to emit a first color light and a second color light;
a charge only capable port for providing a second voltage to a second connected device;
a second light emitting diode proximate to the charge only capable port wherein the second light emitting diode is configured to emit the first color light;
a power supply configured to generate the first voltage and the second voltage and for coupling the first voltage to the data transfer capable port and the second voltage to the charge only capable port; and
a processor configured to detect a data connection request received at the charge only capable port and further configured to generate a control signal for switching the first light emitting diode from the first color light to the second color light in response to the data connection request.

2. The apparatus of claim 1, wherein the data transfer capable port is operative to couple the data signal to the processor.

3. The apparatus of claim 1, further including a display and wherein the data signal comprises a video signal received from the first connected device and the data transfer capable port is operative to couple the video signal to the display.

4. The apparatus of claim 1, wherein the first color light is white and the second color light is blue.

5. The apparatus of claim 1, wherein the first light emitting diode forms a ring around the data transfer capable port.

6. The apparatus of claim 1, wherein the power supply is operative to receive the data connection request and to couple the data connection request to the processor.

7. The apparatus of claim 1, wherein the data transfer capable port comprises a universal serial bus port and the first voltage is a five-volt direct current voltage.

8. A method performed by a processor comprising:
illuminating a first light emitting diode around a data transfer capable port wherein the first light emitting diode is illuminated in a first color;
illuminating a second light emitting diode around a charge only port;
receiving a first data connection request at the charge only port;
illuminating the first light emitting diode a second color in response to the first data connection request;
receiving a second data connection request at the data transfer capable port;
initiating a data connection handshake between a device connected to the data transfer capable port and a processor in response to the second data connection request; and
illuminating the first light emitting diode the second color in response to the initiation of the data connection handshake.

9. The method of claim 8, wherein the first color is white.

10. The method of claim 8, further including generating a video signal in response to a data received from the device and displaying the video signal on a display.

11. The method of claim 8, wherein the processor is a video processor operative to generate a video signal in response to a data signal received from the device.

12. The method of claim 8, wherein the data transfer capable port comprises a universal serial bus type C® connector.

13. The method of claim 8, wherein the data transfer capable port is operative to detect the first data connection request received at the charge only port in response to an indicator generated by the charge only port.

14. The method of claim 8, wherein illuminating the first light emitting diode a second color includes alternating the first color and the second color.

15. The method of claim 8, wherein the second color is blue.

16. The method of claim 8, wherein the method is performed by an aircraft entertainment system.

17. The method of claim 8, wherein the data transfer capable port and the charge only port form a portion of an entertainment system user interface.

18. An entertainment system comprising:
a user interface having a data transfer capable port with a first light emitting diode and a charge only port having a second light emitting diode;
a power supply configured to supply a voltage to the user interface and further configured to detect a data connection request at the charge only port and further configured to generate a control signal in response to detecting the data connection request;
a processor operative to change an illumination color of the first light emitting diode in response to the control signal and to receive a data from the data transfer capable port, to change the illumination color of the first light emitting diode in response to the reception of the data, to generate a video signal in response to the data; and
a display configured to display a video in response to the video signal.

19. The entertainment system of claim 18, wherein the first light emitting diode may emit a white color light and a blue color light.

20. The entertainment system of claim 18, wherein the data is generated by a mobile electronic device coupled to the data transfer capable port.

* * * * *